Dec. 8, 1925. 1,564,687
J. L. KIMBALL
PRESSURE CONTROL APPARATUS FOR CONTROLLING THE OPERATION OF BOILER
FEED PUMPS FOR MAINTAINING FEED LINE PRESSURE A PREDETERMINED VALUE
IN EXCESS OF THE STEAM PRESSURE
Filed Feb. 7, 1924 3 Sheets-Sheet 3

INVENTOR.
James L. Kimball

Patented Dec. 8, 1925.

1,564,687

UNITED STATES PATENT OFFICE.

JAMES LEWIS KIMBALL, OF SALEM, MASSACHUSETTS, ASSIGNOR TO RUGGLES-KLINGE-MANN MFG. CO., OF SALEM, MASSACHUSETTS, A CORPORATION OF MASSACHUSETTS.

PRESSURE-CONTROL APPARATUS FOR CONTROLLING THE OPERATION OF BOILER-FEED PUMPS FOR MAINTAINING FEED-LINE PRESSURE A PREDETERMINED VALUE IN EXCESS OF THE STEAM PRESSURE.

Application filed February 7, 1924. Serial No. 691,271.

*To all whom it may concern:*

Be it known that I, JAMES LEWIS KIMBALL, a citizen of the United States, residing at 9 Dearborn Street, Salem, in the county of Essex and State of Massachusetts, have invented certain new and useful Improvements in Pressure-Control Apparatus for Controlling the Operation of Boiler-Feed Pumps for Maintaining Feed-Line Pressure a Predetermined Value in Excess of the Steam Pressure, of which the following is a specification.

This invention relates to pressure control apparatus for controlling the operation of boiler feed pumps for maintaining feed line pressure a predetermined value in excess of the steam pressure.

The object of my present invention is to provide a boiler feed line pressure controller which will be responsive to the steam pressure and the feed line pressure for controlling any motive means for driving a boiler feed pump and to arrange such controller to operate by varying speed regulating amount to compensate for the variable pumping characteristic of the pump. A further object of my invention is to provide means whereby the controller will operate by steps with means to change the pressure setting of the controller at each stepped position.

With the foregoing and other objects in view, the invention comprises novel means for the control of boiler feed pumps hereinafter more specifically described and illustrated in the accompanying drawings in which Fig. 1 shows a vertical elevation partly in section embodying the features of this invention.

Figure 1:
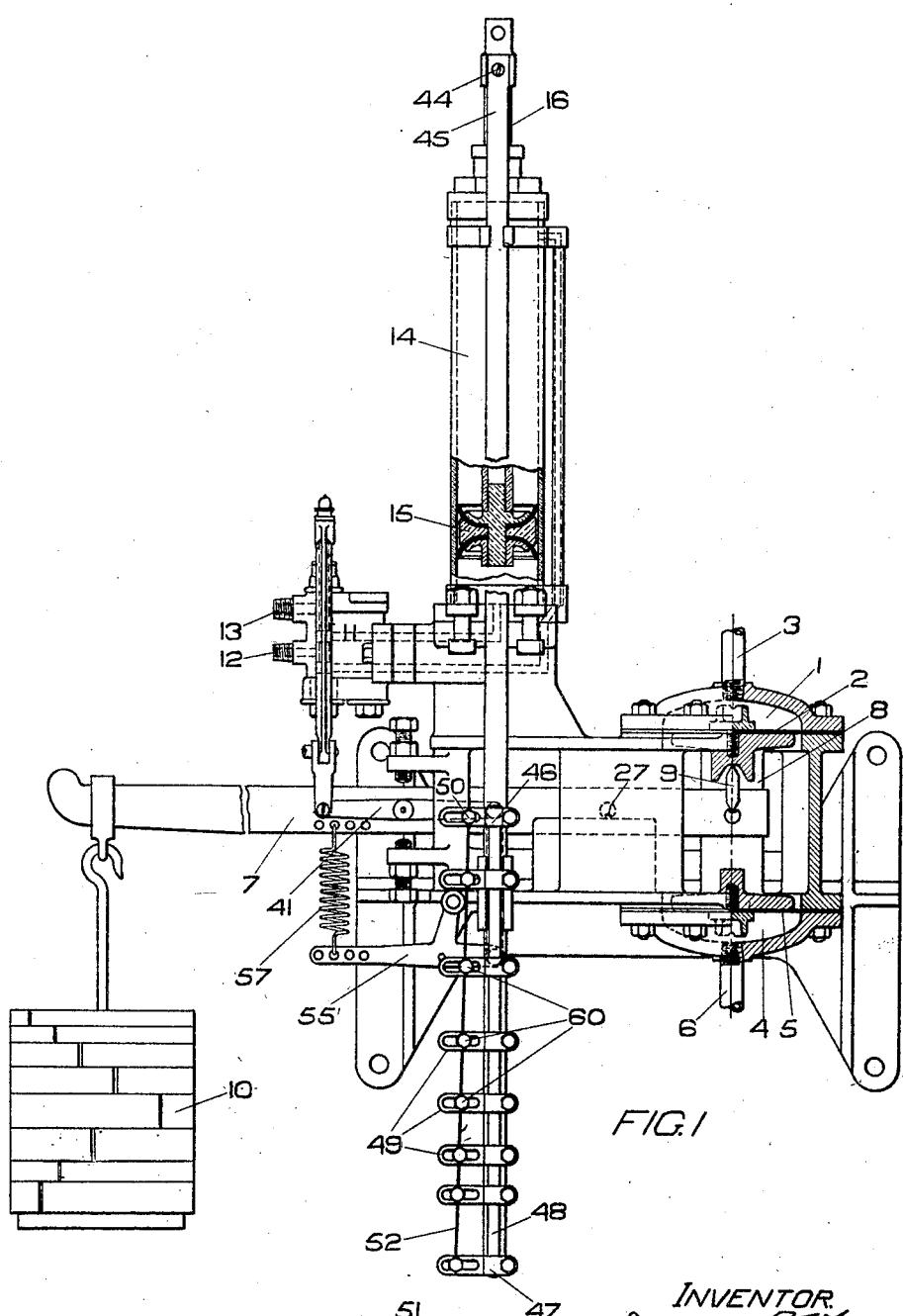

Referring to Fig. 1—a preferred embodiment of a controller suitable for carrying out my invention is made up of the following elements: pressure chamber 1, diaphragm 2 with pressure pipe 3 which connects to the feed line pressure; pressure chamber 4, diaphragm 5 and pressure pipe 6 which connects to the boiler or steam pressure; scale beam 7, pressure cap 8, toggle 9 and counter acting weights 10,—the above parts to be hereinafter referred to as the pressure responsive device. Valve 11 having intake for fluid pressure at 12 and exhaust at 13, hereinafter referred to as the pilot valve. Fluid-pressure motor 14 having piston rod 16 hereinafter referred to as the motor.

Figure 3:
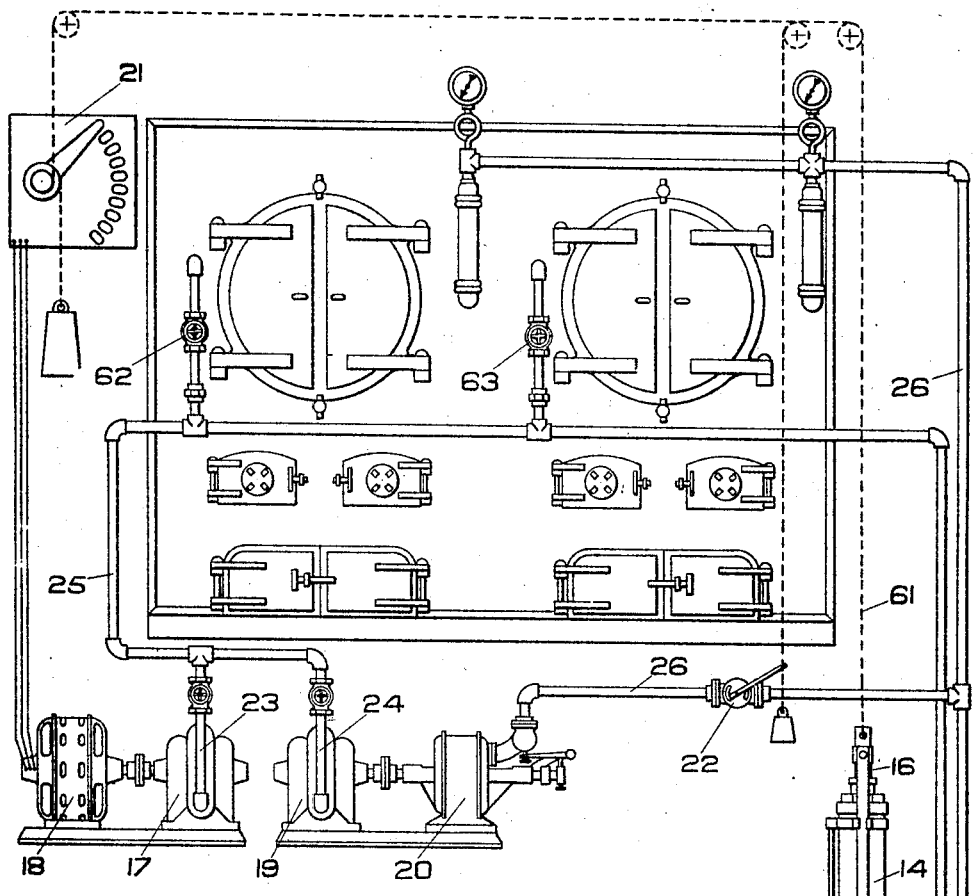
Fig. 3 shows the application of my invention to the control of steam and electrically-driven boiler feed pumps.

Referring to Fig. 3: Two boiler feed units are shown; 17 is an electrically driven unit having a motor 18, and 19 is a steam-driven unit having turbine 20; motor 18 and turbine 20 will be hereinafter referred to as the motive means. 21 represents a rheostat for controlling the electrically-driven motive means, and 22 is a throttling valve for controlling the steam-driven motive means, hereinafter referred to as the speed-controlling means.

Pumps 17 and 19 have discharge pipes 23 and 24 which connect to a common boiler feed line 25; this line also connects with pressure chamber 1 of the pressure-controller by means of pipe connection 3. Turbine 20 of the steam-driven unit has steam supply pipe 26 which supplies steam for operating the turbine; it also has the branch connection 6 to pressure chamber 4 of the controller.

Referring again to Fig. 1, scale beam 7 is fulcrumed at 27 and its right hand end is in contact with pressure cap 8 by means of toggle 9. It will be seen that when the feed line pressure in chamber 1 exceeds the steam pressure in chamber 4, an amount equivalent to the counter weights 10, the scale beam 7 will be in balance and a further increase in pressure in chamber 1 over that in chamber 4 will force the diaphragms 2 and 5 downward raising the weights 10, and that a decrease in pressure in chamber 1 will allow the steam pressure in chamber 4 aided by the counter weights 10 to force the diaphragms 2 and 5 upward and lower the weights 10; in other words, variation in pressure in either pressure chamber 1 or 4 will raise or lower the left hand end of scale beam 7.

Figure 2:
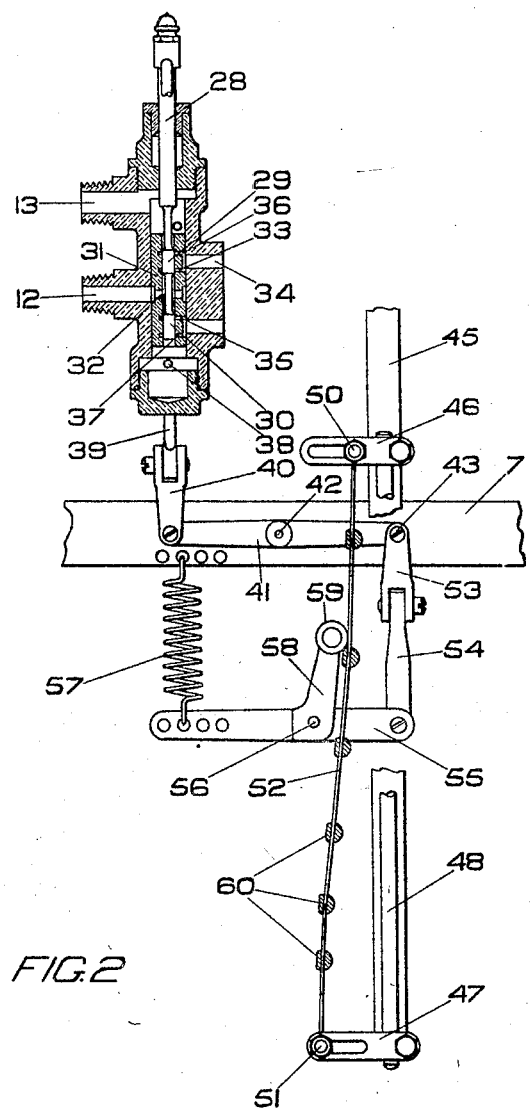
Fig. 2 shows a vertical elevation of such elements as are shown in Fig. 1 employed to effect variable step action of the controller.

Referring now to Fig. 2,—I have illustrated novel means for controlling the operating of the pilot valve 11 both from the pressure responsive device and from the operation of the motor so as to effect a variable control over the pump and the pump motive means to compensate for the variable pumping characteristic of the pump.

Pilot valve 11 may be of any suitable construction; a preferred arrangement is shown in Fig. 2. The pilot valve stem has cylindrical portions 29 and 30 which control the admission and exhaust to opposite ends of the motor, the stem being shown in a natural position in which no water or other fluid pressure can be admitted or exhausted to or from the motor cylinder 14. 31 is a valve bushing having an inlet at 32 which admits pressure between the two cylindrical portions 29 and 30 of the valve stem. When the stem is raised, pressure is admitted at port 33 and communicates through passage 34 to the bottom of the motor cylinder; at the same time, exhaust port 37 is opened to the atmosphere, allowing pressure to escape from the top of the cylinder, and when the stem is lowered, admission port 33 and exhaust port 37 are closed and admission port 35 and exhaust port 36 are opened reversing the motion of the motor. It will be understood that any pressure escaping from the top of the motor cylinder will be exhausted through port 38 to the top of the valve where it will go to waste, through overflow connection 13.

From the foregoing it will be seen that an upward movement of the valve spindle 28 will operate the piston 15 in an upward direction and likewise a downward movement of the valve spindle 28 will operate piston 15 in a downward direction. The valve spindle 28 is operated by movements of the scale beam 7 through yoke connections 39 and 40 to floating lever 41. Floating lever 41 is pivoted to the scale beam 7 at point 42, the right hand end 43 being held stationary while the scale beam is moving the valve spindle 28 to either an upper or lower pressure position.

I will now show how my novel compensating attachment which is operated from the piston rod 16 effects a variable cut off, giving a variable movement to the piston 15 from uniform pressure variation acting on the pressure sensitive device, and thereby governing the speed of the pump in such a way as to compensate for its variable pumping characteristic. Attached to piston rod 16 at point 44 is a bar 45 which moves up and down with the piston rod 16, and attached to this bar are upper and lower slotted arms 46 and 47. Screw studs 50 and 51 are clamped in the slotted end of arms 46 and 47, and a flexible steel blade 52 has its upper end attached to stud 50 and its lower end to stud 51.

It will be seen that the angle of this flexible blade can be varied by the studs being moved in or out in the slotted end of these arms. These upper and lower arms also carry rod 48 to which are clamped other arms 49 of similar construction but arranged to be adjusted vertically in relation to each other. These last-named arms also have studs 60 clamped in their slotted ends and the ends of these studs are slotted to engage the flexible steel blade but are not fastened to it as in the case of the upper and lower studs 50 and 51.

It will be seen that this flexible steel blade can be clamped so as to form any curve required within the limits of adjustment of the studs.

The floating lever 41 is connected by means of link 53 and 54 to compensating lever 55 which has a stationary pivoted bearing at 56; the left hand end of lever 55 is connected to the scale beam by means of a spiral spring 57; arm 58 is secured to lever 55 and has a roll 59 at its upper end. Roll 59 is held in engagement with the flexible blade 52 by means of spring 57.

In the operation of the controller, variations in either the feed line or boiler pressure will operate the scale beam, and as floating lever 41 is pivoted at point 42 and the left hand end connected to the pilot valve stem 28 and the right hand end held stationary for the time being, such variation in pressure will operate the pilot valve stem 28 to a pressure position which in turn will operate motor piston 15. The movement of piston 15 causes a similar motion to be imparted to the flexible blade 52 and this motion continues until the roll 59 comes in contact with one of the studs 60 which will rock compensating lever 55 and floating lever 41, returning the pilot valve to its natural or cut-off position. The movement imparted to pilot valve stem 28 from movement of piston 15 is always in the direction to return the stem 28 to a natural or non-effective position at each cut-off stud, the cut-off position on the upward stroke being on the upper side of the stud as shown in Fig. 2 and the cut off on the downward stroke being at the same point. The rocking of lever 55 will at the same time change the pressure setting of the pressure responsive device so a new pressure valve must be set up before the pressure sensitive device can again operate the motor.

Assuming an increase in the boiler feed line pressure, pressure cap 8 will be forced downward which will raise the left hand end of the scale beam 7 and also the pilot valve stem 28; this admits pressure under piston 15 at the same time venting the top of the cylinder to exhaust, which gives an upward movement to the piston and piston rod 16, also to the bar 45 and flexible blade 52. This motion is continued until one of the studs 60 comes in contact with the roll 59 and this will impart motion to raise the right hand end of floating lever 41 and likewise lower the left hand end of this lever, which in turn closes the valve ports and brings the piston 15 to rest; at the same time, the tension on spring 57 is increased to counteract the increase in pressure in pressure chamber 1; likewise if the steam pressure in pressure chamber 4 is decreased, a similar upward motion will be effected and the tension of spring 57 will be again increased to counteract the decrease in pressure in chamber 4.

Assuming a decrease in the feed line pressure, cap 8 will be forced upward and valve spindle 28 will be lowered which will admit pressure to the top of cylinder 14 and force piston 15 downward which in turn will give an opposite rocking motion to floating lever 41 raising the valve spindle 28 and closing the valve ports and again bringing the piston to rest. This operation however effects a lessening of the spring tension to counteract the loss of pressure in chamber 1; likewise an increase in steam pressure in chamber 4 will give a similar motion to the piston 15 and a yielding of the spring tension to counteract the increase in steam pressure.

It will be understood that if the flexible steel blade 52 were adjusted in a vertical line in relation to bar 45, the pilot valve stem once being moved to either effective position for operating the motor, could not be returned to a non-effective position and piston 15 would make a complete stroke without cut off effect. The angle only of the blade 52 must be so adjusted as to effect the necessary cut-off motion; the studs alone if arranged in a vertical line will not accomplish this result. These studs simply act to give an abrupt motion to the cut-off mechanism and to apply the entire compensating effect at one point so as to obtain step action.

It will be seen that the flexible blade 52 can be formed into any desired curve to give the necessary variable control over the motor from a uniform variation in pressure acting on the pressure sensitive device, and that the studs can be variably arranged to effect a greater or less motion of the motor from a uniform variation in either the steam of feed line pressure.

It will also be seen that the scale beam can be weighted by counter weights 10 to maintain any desired pressure of the feed line in excess of the steam pressure of the boilers and that this pressure differential will be maintained regardless of any variation in the boiler pressure.

I will now explain how this controller operates to control feed water pressure and to compensate for variable pumping characteristics of the pump.

Referring to Fig. 3: For the purpose of illustration, I have shown the piston rod 16 connecting by means of a flexible cable 61 with the throttling valve of the steam-driven unit and the rheostat of the electrically-driven unit, and it will be understood that an upward motion of the piston rod 16 will close the throttle valve 22 and also operate the rheostat 21 to install additional resistance in the motor circuit to slow down the motor 18. It will be understood that centrifugal boiler feed pumps have a variable pumping characteristic in that no water will be delivered until the pump obtains a certain speed, and from this point to its maximum pumping capacity, a variable amount of water will be discharged for a uniform variation in speed.

My invention is to effect a variable control over the pump so that a uniform quantity of water will be discharged for a uniform variation in the demand as indicated by the pressure in the feed line. Assuming that the boiler stop valves 62 and 63 are closed and that pumps are not in operation, and assuming that there is a demand for water to be supplied to the boilers, then the fireman will open slightly these valves and the pressure in the feed line 25 will be reduced accordingly; this will cause the pressure-sensitive device to operate the pilot valve to effect a downward movement of piston rod 16 to speed up the pump. The speed of the pump must be increased to that point where it will commence to deliver water, otherwise the motive means for operating the pump will use up energy without accomplishing any useful result; this means that the controller must operate without compensating effect up to the point where the pump has attained a pumping speed, and from this point on, the cut-off points and the change in pressure setting should be such as to compensate for variable pumping characteristics of the pump. It will be seen that this result can be obtained by adjusting the curvature of the flexible blade 52; this blade can be adjusted to a vertical line for a given distance corresponding to the speed-building-up process or until the pump has attained its pumping characteristic; this means that there will be no cut-off or compensating effect up to this point. From this point on, the blade can be so adjusted that the movement of the controller will be increasingly checked to compensate for the increased pumping efficiency of the pump.

It will be seen by those skilled in the art that I have produced a new and useful boiler feed-line controller which can be used to control both steam and electrically-driven pumping units, or a combination of both.

It will also be seen that the flexible blade 52 with its adjustable steps 60 and method of returning the pilot valve to a noneffective position and adjusting the counteracting force acting on the pressure sensitive device at the same time, that cut off is effected, presenting a certain flexibility which permits the controller to be properly adjusted to compensate for variable factors in the pumping characteristic of the pump or in the elements which control the speed of the pump. The foregoing constructions are presented for the purpose of illustrating the broad principles of this invention and it will be understood that the invention is not to be restricted by reason of the specific construction or applications disclosed or otherwise than as by the claims.

Having thus described my invention, what I claim as new and desire to secure by Letters Patent is:—

1. In apparatus for controlling boiler feed line pressure consisting of a pump for supplying the boiler with water, motive means for driving the pump, means for controlling the speed of the motive means, a motor for actuating the speed-controlling means, a pressure-responsive device controlled in accordance with the steam generated by the boiler and the pressure of water supplied by the pump, means actuated by said pressure-responsive device to control the motor which controls the speed-controlling means, and means operated by the motor for effecting a variable speed control of the motive means.

2. In apparatus for controlling boiler feed line pressure consisting of a pump for supplying the boiler with water, motive means for driving the pump, means for controlling the speed of the motive means, a motor for actuating the speed-controlling means, a pressure-responsive device controlled in accordance with the steam generated by the boiler and the pressure of water supplied by the pump, means actuated by said pressure-responsive device to control the motor which controls the speed-controlling means, and means operated by the motor for effecting a variable step-by-step control of the motive means.

3. In apparatus for controlling boiler feed line pressure consisting of a pump for supplying the boiler with water, motive means for driving the pump, means for controlling the speed of the motive means, a motor for actuating the speed-controlling means, a pressure-responsive device controlled in accordance with the steam generated by the boiler and the pressure of water supplied by the pump, means actuated by said pressure-responsive device to control the motor which controls the speed-controlling means, and compensating means operated by the motor for effecting a variable speed control of the motive means.

4. In apparatus for controlling boiler feed line pressure consisting of a pump for supplying the boiler with water, motive means for driving the pump, means for controlling the speed of the motive means, a motor for actuating the speed-controlling means, a pressure-responsive device controlled in accordance with the steam generated by the boiler and the pressure of water supplied by the pump, means actuated by said pressure-responsive device to control the motor which controls the speed-controlling means, and compensating means operated by the motor for effecting a variable step-by-step control of the motive means.

5. In a pressure controller, in combination a pressure-responsive device consisting of two opposing pressure chambers, means to counteract a portion of the pressure in one of said chambers, means controlled by variations in pressure in either of said chambers to operate a motor to control the pressure in the counteracted chamber a predetermined amount in excess of the pressure in the other chamber and compensating means operated by the motor for effecting a variable step-by-step control of the motor.

6. In a pressure controller, in combination a pressure-responsive device consisting of two opposing pressure chambers, means to counteract a portion of the pressure in one of said chambers, means controlled by variations in pressure in either of said chambers to operate a motor to control the pressure in the counteracted chamber a predetermined amount in excess of the pressure in the other chamber and compensating means operated by the motor for effecting a variable control of the motor from a uniform variation in pressure in either of said pressure chambers.

7. In a pressure controller, in combination a pressure-responsive device and a motor for controlling the pressure, means to operate the motor from variations in pressure acting on the pressure-responsive device, compensating means operated by the motor for rendering the motor inoperative and to cause a further change in pressure acting on the pressure-sensitive device for a further operation of the motor, said means including a flexible blade and means to adjust the curvature of said blade, and means operable from the blade to effect a variable control over the motor.

8. In a pressure controller, in combination a pressure-responsive device and a motor for controlling the pressure, means to control the effective operation of the motor from variations in pressure acting on the pressure-responsive device, compensating means operated by the motor including a flexible blade and means to adjust said blade, and means operated from said blade to effect a greater or less pressure variation acting on the pressure-responsive device between the limits of operation of the motor, said adjustment being arranged to effect a variable control over the motor in relation to variations in pressure acting on the pressure-responsive device.

9. In apparatus for controlling boiler-feed-line pressure, a pump for supplying the boiler with water, the pump having variable pumping characteristics, whereby the supply of water to the boiler by the pump will be increased and decreased by uniform amounts corresponding to variable increases and decreases in the speed of the pump, motive means for driving the pump, means for controlling the speed of the motive means, a motor for controlling the speed-controlling means, a pressure-responsive device controlled in accordance with the steam generated by the boiler and the pressure of the water supplied by the pump, means actuated by the pressure-responsive device to control the motor, and compensating means controlled by the motor to cause the motor to control the speed-controlling means step by step, the compensating means being constructed and arranged to effect a variable operation of the motive means corresponding to uniform variations in the pressure acting on the pressure-responsive device to compensate for the variable pumping characteristics of the pump.

10. In a pressure system, a pump for controlling the pressure in the system, the pump having variable pumping characteristics, whereby the supply of water to the boiler by the pump will be increased and decreased by uniform amounts corresponding to variable increases and decrease in the speed of the pump, motive means for driving the pump, means for controlling the speed of the motive means, a motor for controlling the speed-controlling means, a pressure-responsive device responsive to the pressure in the system, means actuated by the pressure-responsive device for controlling the motor, and means controlled by the motor to cause the motor so to control the speed-controlling means as to effect a variable operation of the motive means corresponding to uniform variations in the pressure acting on the pressure-responsive device to compensate for the variable pumping characteristics of the pump.

11. In apparatus for controlling boiler-feed-line pressure, a pump for supplying the boiler with water, the pump having variable pumping characteristics, whereby the supply of water to the boiler by the pump will be increased and decreased by uniform amounts corresponding to variable increases and decreases in the speed of the pump, motive means for driving the pump, means for controlling the speed of the motive means, a motor for controlling the speed-controlling means, a pressure-responsive device controlled in accordance with the steam generated by the boiler and the pressure of the water supplied by the pump, means actuated by the pressure-responsive device for controlling the motor and means controlled by the motor to cause the motor so to control the speed-controlling means as to effect a variable operation of the motive means corresponding to uniform variations in the pressure acting on the pressure-responsive device to compensate for the variable pumping characteristics of the pump.

JAMES L. KIMBALL.